Patented July 31, 1928.

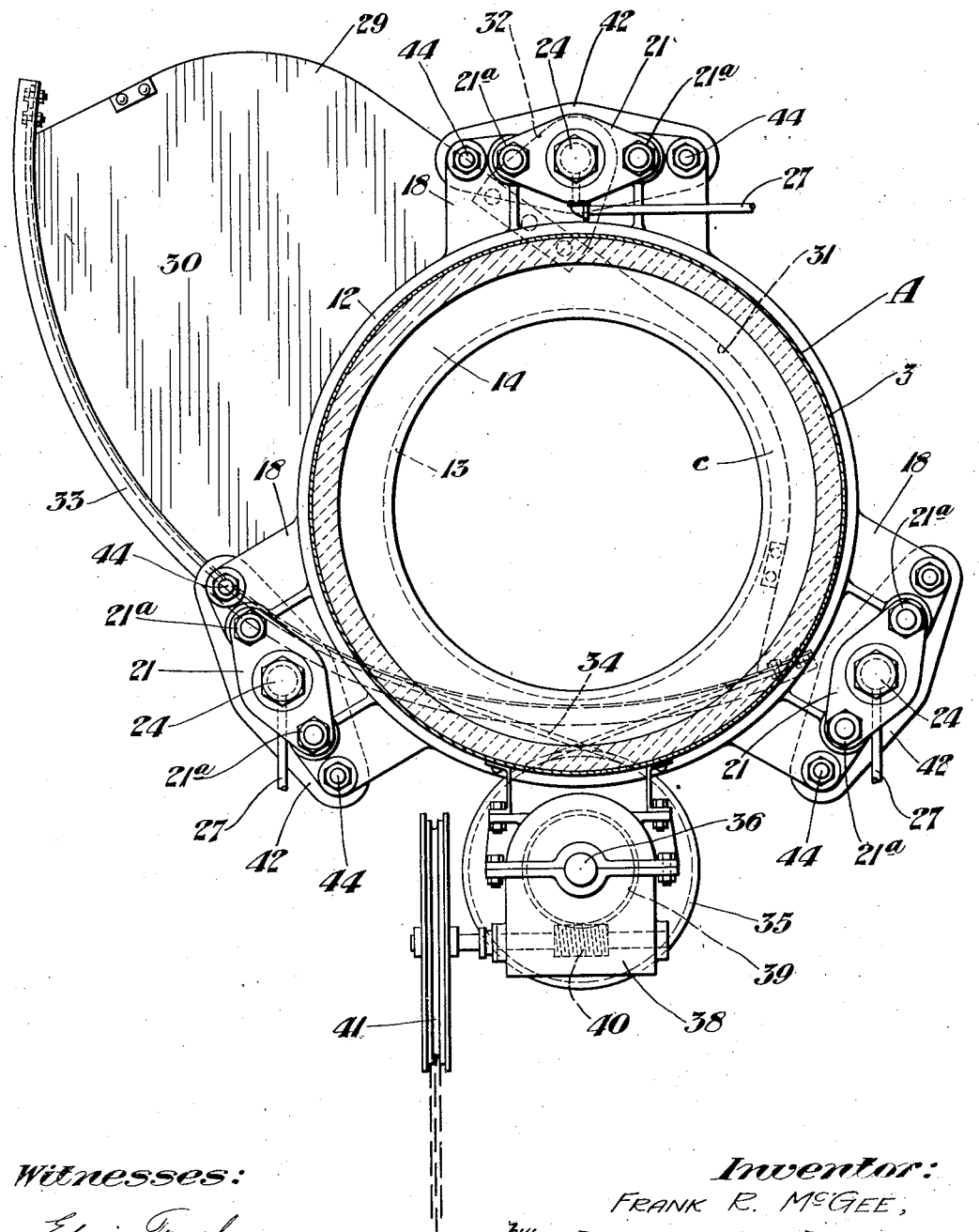

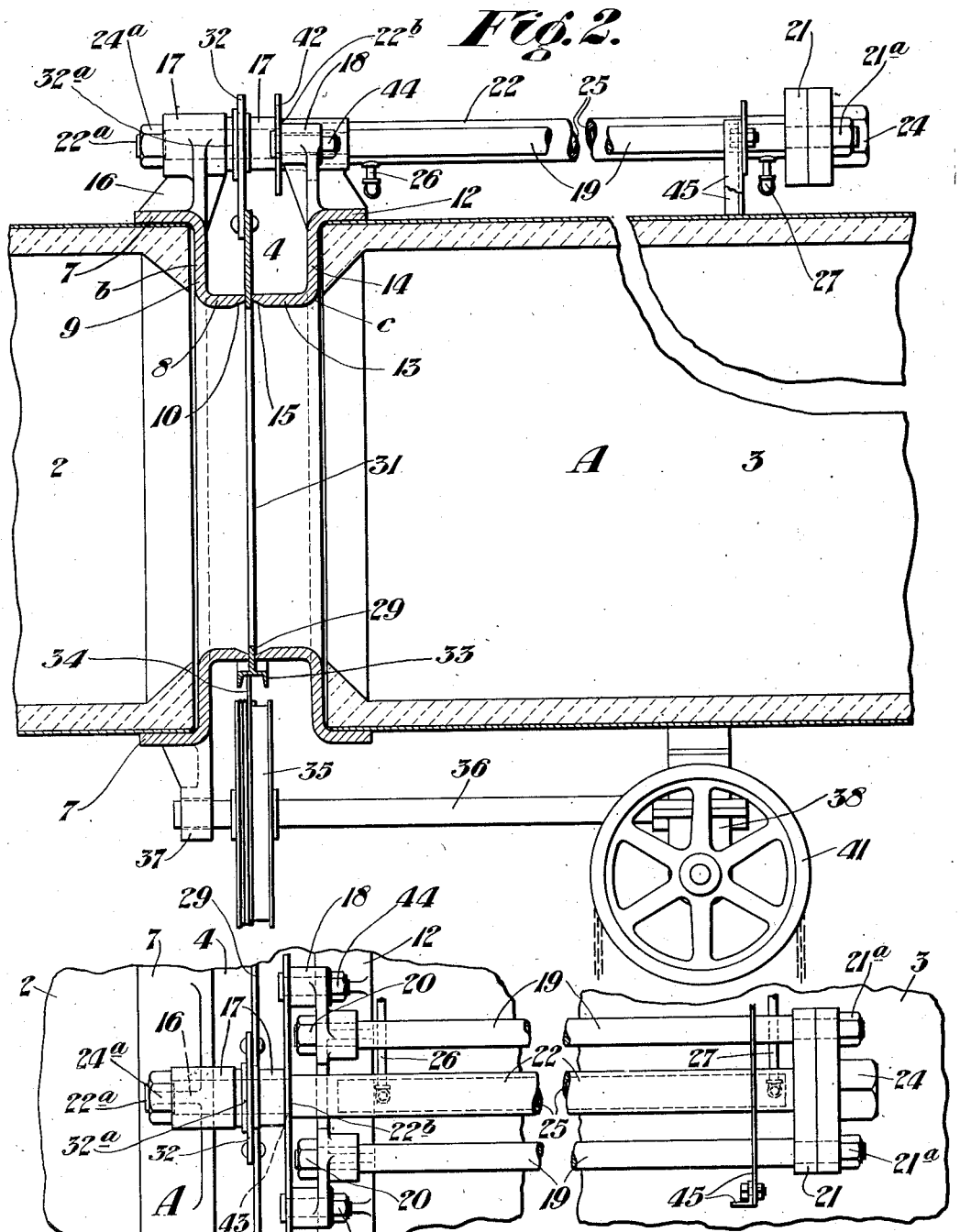

1,678,867

UNITED STATES PATENT OFFICE.

FRANK R. McGEE, OF STEUBENVILLE, OHIO.

VALVE.

Application filed April 22, 1927. Serial No. 185,717.

This invention relates to valves and more particularly to plate valves, and has for one of its objects the provision of a novel form of valve construction in which the valve seats, or at least one of the valve seats, are moved into sealing engagement with the valve plate.

Another object is to provide a novel form of valve seat which will form a gas-tight seal with the valve plate.

A further object is to provide novel means for maintaining the valve seats in vertical and horizontal alinement.

A still further object is to provide a valve construction having the novel arrangement, construction and design of parts hereinafter described in detail and illustrated in the accompanying drawings.

In the drawings—

Figure 1 is a sectional end view of a pipe line having a valve constructed in accordance with the invention embodied therein.

Figure 2 is a longitudinal sectional elevation thereof.

Figure 3 is a fragmentary top plan showing one of the thermal expansion units.

Referring more particularly to the drawings, the letter A designates the pipe line as a whole, which may be composed of any number of sections secured together in any well known manner. The two sections 2 and 3, shown in the drawings, are each composed of a metal shell 5 and refractory lining 6, and are spaced apart to form a valve-way 4.

A flexible valve seat member $b$, comprising two oppositely extending flange portions 7 and 8 joined by a flexible web 9, is secured to the pipe line section 2 by welding or otherwise securing the flange 7 to the metal shell 5. The free edge of the flange 8 of the valve seat member $b$ is tapered or beveled as at 10 to form a narrow seat portion adapted to engage the valve plate, to be described.

A second valve seat member $c$, comprising two oppositely extending flange portions 12 and 13 joined by a flexible web 14, is rigidly secured to the shell 5 of the section 3 of the pipe line by having its flange 12 fitted over the end of the pipe section 3 and secured thereto by welding or other similar means. The free edge of the flange 13 of the valve seat member $c$ is also tapered or beveled as at 15, to form a narrow seat portion adapted to engage the valve plate.

The valve seat $b$ is provided at three spaced points with integral outwardly extending lugs 16 on the flange 7, which lugs are apertured and provided with horizontally extending tubular supporting portions 17.

The valve seat $c$ is provided at three spaced points with pairs of circumferentially spaced outwardly extending lugs 18, each of which is apertured at four points for a purpose to be described.

Pull rods 19 have one end passed through one of the apertures of the lugs 18 and secured by nuts 20, providing spaced pairs of the pull rods 19 which are joined at their free ends by a cross-head 21 and nuts $21^a$. Thermal expansion rods 22 have one end passed through the tubular portions 17 of the lugs 16 and have their other ends projecting through an aperture in the cross-heads 21 carried by the pull rods 19. The rods 22 are secured in the cross-heads 21 and lugs 16 by nuts 24 and $24^a$, respectively.

The thermal expansion rods 22 are preferably formed tubular for at least a portion of their length, as at 25, so as to provide for the passage of fluids of different temperature therein to expand and contract the rods. Suitable tubular conduits 26 and 27 are tapped into the portions 25 of the rods 22 to permit the passage of fluid into and from the portions 25 of the rods. The conduits 26 and 27 are connected to any suitable source of supply and drain, respectively, not shown.

The purpose of the thermal expansion rods 22 is through thermal application, to cause the rods 22 to lengthen or shorten as required, they being connected at one end through the cross-head 21 and pull rods 19 to the valve seat $c$, and connected directly to the lug 16 on the valve seat $b$ will thus transmit an amount of movement equal to their longitudinal expansion or contraction to the gas main sections so as to deflect said sections and move the valve seats $b$ and $c$ away from each other.

A valve plate 29 is adapted to be moved between the valve seats $b$ and $c$, and comprises a curved plate having a solid or cut-off portion 30 and an apertured or open portion 31. The valve plate 29 is hingedly supported on the tubular portion 17 of the upper or top lug 16 by a hinge plate 32 which is secured to the valve plate 29 and is apertured to loosely fit on a bushing $32^a$ on said portion 17 so as to form a pivotal and sliding fit thereon.

The valve plate 29 is provided with a channel guide 33 on its outer edge and is adapted to be operated by a cable 34 which has its ends secured to the opposite ends of the channel guide 33 and has its intermediate portion wrapped several times around a drum 35.

The drum 35 is mounted on a power shaft 36 journaled at one end in a bearing bracket 37 projecting from the valve seat $b$, and at its other end in a worm and worm-wheel housing 38 secured to the pipe section 3.

The shaft 36 is adapted to receive its power through the worm-wheel 39 and worm 40, which worm has its shaft extended at one end on which a chain wheel 41 or other source of power is mounted.

Alinement plates 42 are provided to maintain the pipe sections 2 and 3 in horizontal and vertical alinement. The plates 42 are provided with a centrally arranged aperture 43 to receive a reduced end $22^a$ of the expansion rods 22. The plates 42 are adapted to be mounted on the reduced ends $22^a$ of the rods 22 before said rods are passed through the portions 17 of the lugs 16 so that said plates will be clamped between the shoulder $22^b$ on the rods 22 and the end of the portion 17 of the lug 16. The plates 42 are further apertured adjacent each end to receive bolts 44 which also pass through the apertures in the lugs 18 on the valve seat $c$ and hold the ends of the plates rigid relative to the valve seat $c$ and the pipe section 3. In operation, when the expansion rods 22 are expanded or contracted, the plates 42 will be deflected. However, due to their mounting, the plates 42 will serve to maintain the ends of the gas main sections 2 and 3 in horizontal and vertical alinement.

A supporting bracket 45 is secured to the pipe section 3 under each of the pairs of pull rods 19 adjacent the free ends of said rods and serves to support said rods and the cross-heads 21.

In operation, the rods 22 will be heated to expand their length so as to deflect the gas main sections and move the valve seats $b$ and $c$ away from each other. The drum 35 will then be operated to move the valve plate 29 between the valve seats $b$ and $c$. After the valve plate 29 is positioned, the rods 22 will be cooled either by removing the source of heat or by admitting cooling fluid, thereby causing the rods 22 to contract and move the valve seat $b$ toward the valve seat $c$ and forcing said valve seats into sealing engagement with said valve plate. The valve seats $b$ and $c$ are in themselves flexible due to their novel construction and, therefore, if the valve plate is not of constant thickness the valve seats will flex sufficiently to compensate for the differences in thickness of the valve plate and form a perfect seal.

While I have shown and described one specific embodiment of my invention, it will be understood that I do not wish to be limited thereto since various modifications may be made, such as providing different forms of valve plate operating mechanism and different valve plate mountings, without departing from the scope of my invention as defined in the appended claims.

I claim—

1. The combination with a pipe line comprising at least two sections which are spaced apart to form a valve-way, a valve seat rigidly secured to one of said sections, a second valve seat rigidly secured to the other of said sections, said first named valve seat being provided at three spaced points with integral outwardly extending lugs having horizontally extending tubular supporting portions, said second named valve seat being provided at three spaced points with pairs of circumferentially spaced outwardly extending lugs, a plate valve pivotally mounted on the tubular supporting portion of one of said lugs on said first named valve seat and movable in said valve-way, a plurality of pairs of pull rods secured at one end to said pairs of lugs on said second named valve seat, cross-heads secured to the other ends of each of said pairs of pull rods, thermally expansible rods having one end secured to said cross-heads and having their other ends passing through and secured in said tubular supporting portions of said lugs on said first named valve seat, said thermally expansible rods being adapted to move said valve seats relative to each other when expanded or contracted by changes in temperature, and flexible alinement plates rigidly secured at their centers to each of said thermally expansible rods and rigidly secured at their respective ends to the lugs of said pairs of lugs on said second named valve seat, said alinement plates being adapted to maintain said valve seats and the ends of said pipe line sections in horizontal and vertical alinement.

2. The combination with a pipe line comprising at least two sections which are spaced apart to form a valve-way, a flexible valve seat rigidly secured to one of said sections, a second flexible valve seat rigidly secured to the other of said sections, said first named valve seat being provided at a plurality of spaced points with integral outwardly extending lugs, said second named valve seat being provided at a plurality of spaced points with pairs of circumferentially spaced outwardly extending lugs, a plate valve pivotally mounted on one of said lugs on said first named valve seat and movable in said valve-way, a plurality of pairs of pull rods secured at one end to said pairs of lugs on said second named valve seat, cross-heads secured to the other ends of each of said pairs of pull rods, thermally expansible rods having one end secured to said cross-heads and having their other ends secured directly to said lugs on said first named valve seat, said thermally expansible rods being adapted to move said valve seats relative to each other when expanded or contracted by changes in temperature, and flexible alinement plates rigidly secured to each of said thermally expansible rods and rigidly secured to said pairs of lugs on said second named valve seat, said alinement plates being adapted to maintain said valve seats and the ends of said pipe line sections in horizontal and vertical alinement.

3. The combination with a pipe line comprising at least two sections which are spaced apart to form a valve-way, a flexible valve seat rigidly secured to one of said sections, a second flexible valve seat rigidly secured to the other of said sections, said first named valve seat being provided at a plurality of spaced points with integral outwardly extending lugs, said second named valve seat being provided at a plurality of spaced points with pairs of circumferentially spaced outwardly extending lugs, a plate valve pivotally mounted on one of said lugs on said first named valve seat and movable in said valve-way, a plurality of pairs of pull rods secured at one end to said pairs of lugs on said second named valve seat, cross-heads secured to the other ends of each of said pairs of pull rods, thermally expansible rods having one end secured to said cross-heads and having their other ends secured directly to said lugs on said first named valve seat, said thermally expansible rods being adapted to move said valve seats relative to each other when expanded or contracted by changes in temperature, flexible alinement plates rigidly secured to each of said thermally expansible rods and rigidly secured to said pairs of lugs of said second named valve seat, and means for supporting said pull rods and said thermally expansible rods at a point adjacent said cross-heads.

In testimony whereof, I have hereunder signed my name.

FRANK R. McGEE.